US012006025B2

(12) United States Patent
Bertolini et al.

(10) Patent No.: US 12,006,025 B2
(45) Date of Patent: Jun. 11, 2024

(54) LEADING EDGE STRUCTURE FOR A FLOW CONTROL SYSTEM OF AN AIRCRAFT

(71) Applicant: AIRBUS OPERATIONS GMBH, Hamburg (DE)

(72) Inventors: Ivano Bertolini, Hamburg (DE); Martin Obermaier, Hamburg (DE); Michael Höft, Hamburg (DE); Frank Nielsen, Hamburg (DE); Sergej Rajkowski, Hamburg (DE); Jeff Wee Hong Yap, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 130 days.

(21) Appl. No.: 17/796,520

(22) PCT Filed: Jan. 27, 2021

(86) PCT No.: PCT/EP2021/051876
§ 371 (c)(1),
(2) Date: Jul. 29, 2022

(87) PCT Pub. No.: WO2021/151953
PCT Pub. Date: Aug. 5, 2021

(65) Prior Publication Data
US 2023/0294820 A1  Sep. 21, 2023

(30) Foreign Application Priority Data
Jan. 30, 2020  (DE) .................... 10 2020 102 324 .3

(51) Int. Cl.
*B64C 21/04* (2023.01)
*B64C 21/06* (2023.01)
*B64C 21/08* (2023.01)

(52) U.S. Cl.
CPC .............. *B64C 21/04* (2013.01); *B64C 21/06* (2013.01); *B64C 21/08* (2013.01)

(58) Field of Classification Search
CPC ....... B64C 21/02; B64C 21/025; B64C 21/04; B64C 21/06; B64C 21/08; B64C 2230/06; B64C 2230/20; B64C 2230/22
See application file for complete search history.

(56) References Cited

U.S. PATENT DOCUMENTS 7,866,609 B2 * 1/2011 Parikh .................... B64C 21/06
244/209
8,128,037 B2 * 3/2012 Powell .................. B64C 21/025
244/130
(Continued)

FOREIGN PATENT DOCUMENTS

| EP | 2 853 485 | 4/2015 |
|----|-----------|--------|
| WO | 2019/149590 | 8/2019 |

OTHER PUBLICATIONS

International Search Report for PCT/EP2021/051876, dated Apr. 14, 2021 (3 pages).
(Continued)

*Primary Examiner* — Tien Q Dinh
*Assistant Examiner* — William L Gmoser
(74) *Attorney, Agent, or Firm* — Nixon & Vanderhye P.C.

(57) ABSTRACT

A leading edge structure (11) for a flow control system of an aircraft (1), including a leading edge panel (13) that surrounds a plenum (17), wherein the leading edge panel (13) has a first side portion (21), a second side portion (27), an inner surface (33) and an outer surface (37), wherein the leading edge panel (13) having micro pores (45) forming a fluid connection between the plenum (17) and the ambient flow (39), wherein a first air inlet/outlet device (49) is arranged in the first side portion (21) and a second air inlet outlet/device (51) is arranged in the second side portion (27),
(Continued)

fluidly connected to the plenum (17), and wherein the first air inlet/outlet device (49) comprises a pivotable first door (55) and the second air inlet outlet/device (51) comprises a pivotable second door (61).

20 Claims, 7 Drawing Sheets

(56) References Cited

U.S. PATENT DOCUMENTS

| | | |
|---|---|---|
| 8,245,976 B2 | 8/2012 | Sakurai et al. |
| 2010/0181435 A1* | 7/2010 | Sakurai .................. B64C 21/08 |
| | | 244/209 |
| 2015/0083866 A1* | 3/2015 | Biedscheid ............. B64C 21/06 |
| | | 244/91 |
| 2019/0283866 A1* | 9/2019 | Büscher ................. B64C 21/08 |
| 2019/0390601 A1* | 12/2019 | Casado-Montero ...... F02C 7/04 |

OTHER PUBLICATIONS

Written Opinion of the ISA for PCT/EP2021/051876, dated Apr. 14, 2021 (6 pages).

\* cited by examiner

LEADING EDGE STRUCTURE FOR A FLOW CONTROL SYSTEM OF AN AIRCRAFT

RELATED APPLICATION

This application is the U.S. national phase of International Application No. PCT/EP2021/051876, filed Jan. 27, 2021, which designated the U.S. and claims priority to German patent application DE 10 2020 102 324.3, filed Jan. 30, 2020, the entire contents of each of which are hereby incorporated by reference.

BACKGROUND AND SUMMARY

The present invention relates to a leading edge structure for a flow control system of an aircraft, in particular for a Hybrid Laminar Flow Control system, where air is sucked in a porous surface of a flow body in order to extend the region of laminar flow along the flow body. Further aspects of the present invention relate to a vertical tail plane (VTP) comprising such a leading edge structure, and an aircraft comprising such a leading edge structure or such a vertical tail plane. It might also be possible and preferred that the leading edge structure is part of a horizontal tail plane or of a wing for an aircraft.

The leading edge structure comprises a leading edge panel that surrounds a plenum in a curved, i.e. arcuate, manner. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure, the first attachment end being configured for attachment to a further structure located downstream from the leading edge. Further, the leading edge panel has a second side portion opposite the first side portion, wherein the second side portion extends from the leading edge point to a second attachment end on a second side of the leading edge structure opposite the first side, the second attachment end being configured for attachment to a further structure downstream from the leading edge.

The leading edge panel comprises an inner surface facing the plenum and an outer surface in contact or configured to be in contact with an ambient flow. Further, the leading edge panel comprises a plurality of micro pores, such as perforations, forming a fluid connection between the plenum and the ambient flow, so that air from the ambient flow can be sucked in through the micro pores into the plenum, and, where applicable, pressurized air from the plenum can be blown out through the micro pores into the ambient flow.

Further, a first air inlet/outlet device is arranged in the first side portion and a second air inlet/outlet device is arranged in the second side portion of the leading edge panel. Both first and second air inlet/outlet devices are configured for letting in air of the ambient airflow into the plenum and for discharging air from the plenum into the ambient air flow. The leading edge panel might be formed integrally or might be formed separated by two or more separate panel parts arranged next to each other in the span direction, wherein a first panel part includes the micro pores and a second panel part includes the first and second air inlet/outlet devices. The first air inlet/outlet device and the second air inlet/outlet device are fluidly connected to the plenum, preferably via a duct.

The first air inlet/outlet device comprises a first door pivotable relative to the leading edge panel by a first hinge about a first hinge axis. Likewise, the second air inlet outlet/device comprises a second door pivotable relative to the leading edge panel by a second hinge about a second hinge axis. The first and second doors are preferably formed and arranged symmetrically but might also be formed or arranged asymmetrically.

Such leading edge structures are known in the art of hybrid laminar flow control systems. In particular, it is known to arrange a first air inlet/outlet device in a first side of a VTP of an aircraft and to arrange a second air inlet/outlet device in a second side of the vertical tail plane. Each air inlet/outlet device comprises two doors, one inlet door opening to the front for letting in air from the ambient flow to purge the pores, and one outlet door opening to the rear for letting out air into the ambient flow to cause suction at the pores. The inlet doors on both sides of the VTP are actuated by one actuator and the outlet doors on both sides of the VTP are actuated by another actuator.

The object of the present invention is to provide a more efficient leading edge structure allowing a simplified air inlet/outlet design and actuation.

This object is achieved in that both the first door and the second door are pivotable between an outlet position, a closed position, and an inlet position. In the outlet position, air from an ambient air flow is let in through the respective first or second air inlet/outlet device into the plenum, wherein the respective first or second door preferably pivots outwards into the ambient air flow so that it extends external to an outer mold line, preferably forming a rearward facing opening. In the closed position, no air stream through the respective first or second inlet/outlet device is allowed and the door is preferably flush with the outer mold line. In the inlet position, air from an ambient air flow is let out from the plenum through the respective first or second air inlet/outlet device into the ambient air flow, wherein the respective first or second door preferably door pivots inwards inside the leading edge structure so that it extends internal to the outer mold line, preferably forming a forward facing opening.

By such a design of the leading edge structure only one door per each air inlet/outlet device is required, thereby largely simplifying the leading edge structure and reducing parts, thus reducing costs and weight.

According to a preferred embodiment, one single actuator is provided for commonly actuating the first door and the second door for common, preferably symmetric movement between the outlet position, the closed position and the inlet position. In such a way, only one actuator is required for actuating both the first door and the second door, thereby further simplifying the leading edge structure and reducing parts, costs and weight.

According to a preferred embodiment, the actuator is formed as a linear actuator configured to adjust upon actuation the distance between its first and a second ends. The linear actuator might be an electric, hydraulic and/or pneumatic actuator. The linear actuator represents a very simple and efficient actuator.

In particular, it is preferred that the actuator, preferably the first end of the actuator, is connected to the first door and to the second door via a linkage. The linkage is configured to transfer a linear movement of the actuator into a pivot movement of the first and second doors between the outlet position, the closed position and the inlet position. Such a linkage forms a very simple and efficient means to transfer the linear movement of the actuator into the pivot movement of the first and second doors.

It is further preferred that the linkage comprises a first lever mounted to the first door at the first hinge axis in a torque proof manner, such as fixedly or via gear. The linkage further comprises a second lever mounted to the second door at the second hinge axis in a torque proof manner, such as fixedly or via gear. The first lever and the second lever are connected via a link that is pivotably mounted to the first lever via a third hinge about a third hinge axis and that is pivotably mounted to the second lever via a fourth hinge about a fourth hinge axis. Preferably, the first, second, third and fourth hinge axes are parallel to one another. In such a way, a simple and efficient linkage is formed wherein actuation moments for pivoting the first and second doors are introduced into the first and second doors only directly in the hinge line, i.e. in the first and second hinge axes, so the first and second doors do not need to receive any forces outside of the hinge axes.

It is also preferred that the actuator is pivotably mounted with its first end to the first lever or to the second lever via a fifth hinge having a fifth hinge axis spaced apart from the first hinge axis or from the second hinge axis and preferably parallel to the first and/or second hinge axes. Preferably, the actuator is configured for being pivotably mounted with its second end to a front spar of the related aircraft structure to which the leading edge structure is attached, preferably of a vertical tail plane box, via a sixth hinge having a sixth hinge axis preferably parallel to the fifth hinge axis. In such a way, the actuator represents a length adjustable link transferring only linear loads, which relates to a simple and efficient design.

It is particularly preferred that the first lever extends beyond the third hinge, so that the third hinge is positioned between and spaced apart from the first hinge and the fifth hinge. Alternatively, it is preferred that the second lever extends beyond the fourth hinge, so that the fourth hinge is positioned between and spaced apart from the second hinge and the fifth hinge. In such a way, the part of the first or second lever extending beyond the third hinge serves as actuation lever and increases the actuation moment that can be transferred to the link and eventually to both the first hinge and the second hinge.

Alternatively, it is preferred that the actuator is connected to the first lever or to the second lever via an actuation arm. The actuation arm is mounted to the first lever at the first hinge axis or to the second lever at the second hinge axis in a torque proof manner, such as fixedly or via gear. The actuator is pivotably mounted with its first end to the actuation arm via a fifth hinge having a fifth hinge axis spaced apart from the first hinge axis or from the second hinge axis and preferably parallel to the first and/or second hinge axes. Preferably, the actuator is configured for being pivotably mounted with its second end to a front spar of the related aircraft structure to which the leading edge structure is attached, preferably of a vertical tail plane box, via a sixth hinge having a sixth hinge axis preferably parallel to the fifth hinge axis. In such a way, by the actuation arm a separate actuation lever is formed that introduces the actuation moment directly into the first or second hinge independent of the first or second lever, which relates to another simple and efficient design.

According to an alternative embodiment, the actuator, preferably the first end of the actuator, is connected to the first door and to the second door via a gear transmission. The gear transmission is configured to transfer a linear movement of the actuator into a pivot movement of the first and second doors between the outlet position, the closed position and the inlet position. Such a gear transmission represents another very simple and efficient means to transfer the linear movement of the actuator into the pivot movement of the first and second doors.

In particular, it is preferred that the gear transmission comprises a first gear, in particular a gear wheel or a geared shaft, connected to the first door in a torque proof manner, such as fixedly or via a gear, coaxially with the first hinge axis. The gear transmission comprises a second gear, in particular a gear wheel or geared shaft, connected to the second door in a torque proof manner, such as fixedly or via a gear, coaxially with the second hinge axis. The first gear and the second gear are connected in a torque transferring manner. First and second gears are preferably have the same radius, but might also have different radii. In such a way, a simple and efficient gear transmission is formed.

It is particularly preferred that the first gear and the second gear are directly engaged. In such a way, no additional gears are required and a very simple arrangement is provided.

Alternatively, it is preferred that the first gear and the second gear are connected via one or more additional gears. In such a way, a very efficient gear transmission might be formed where only a minimum actuator movement or minimum actuator force is required, depending on how the additional gears are configured.

It is also preferred that the actuator is connected to the first gear or to the second gear via an actuation lever. The actuation lever is mounted to the first gear or to the second gear or to one additional gear in a torque proof manner, such as fixedly or via gear. The actuator is pivotably mounted with its first end to the actuation lever via a fifth hinge having a fifth hinge axis spaced apart from an axis of the first gear, the second gear or the additional gear. Further, the actuator is preferably configured for being pivotably mounted with its second end to a front spar of the related aircraft structure to which the leading edge structure is attached, preferably of a vertical tail plane box, via a sixth hinge having a sixth hinge axis preferably parallel to the fifth hinge axis. In such a way, a simple and efficient actuation of the gear transmission is enabled.

In a preferred embodiment, the linkage or the gear transmission is configured such that the first door and the second door are moved between the outlet position, the closed position and the inlet position in a symmetrical way. In such a way, no air tight sealing of the first and second doors is required, so that weight and costs can be saved. However, the linkage or the gear transmission might also be configured such that the first and second doors are actuated asymmetrically.

According to another preferred embodiment, the first hinge axis is arranged at a leading edge of the first door. Additionally or alternatively, it is preferred that the second hinge axis is arranged at a leading edge of the second door. In such a way, when the first or second door pivots inwards, a forward facing inlet opening is formed between the trailing edge of the first or second door and the outer skin beside the door, while when the first or second door pivots outwards, a rearward facing outlet opening is formed between the trailing edge of the first or second door and the outer skin beside the door. This means, by pivot movement of the first or second door about only a single hinge axis it is possible to move the respective first or second door between all three position: the inlet position, the closed position and the outlet position, while in the inlet position the first or second door does not project out of the outer mold line into the ambient flow.

According to another preferred embodiment, the first hinge and the second hinge are mounted to a duct structure of a duct forming a fluid connection between the first and second air inlet/outlet devices and the plenum. The duct structure in turn is mounted to the leading edge panel and/or to the front spar. In such a way, the first and second doors are not mounted directly to the leading edge panel, such that they are independent from the leading edge panel, which might simplify structure, manufacturing and installation of the leading edge panel. Alternatively, the first hinge and the second hinge might also be mounted to the leading edge panel directly, such that the first and second doors are supported at the leading edge panel directly. In this way, sealing of the first and second air inlet/outlet devices is simplified.

According to another preferred embodiment, the leading edge panel comprises first and second panel parts arranged next to each other in the span direction, wherein the first panel part includes the micro pores and the second panel part includes the first and second air inlet/outlet devices. The first and second panel parts are formed either integrally as one common part or separately as two separate parts that can be mounted together or mounted next to each other. In such a way, the micro pores and the first and second air inlet/outlet devices do not need to be arranged at the same span level of the leading edge panel or in the same panel part, but can be arranged in subsequent parts of the leading edge panel with respect to the span direction.

In an preferred alternative embodiment of the leading edge structure according to any of the embodiments of the invention as described above, instead of having only one single actuator for commonly actuating the first and second doors, two actuators might be provided, such that a first actuator is configured for actuating the first door for movement between the outlet position, the closed position and the inlet position, while the second actuator is configured for actuating the second door for movement between the outlet position, the closed position and the inlet position. The first and second actuators are preferably formed as the actuator described above. In particular, the leading edge structure comprises a leading edge panel that surrounds a plenum in a curved manner, the plenum extending in a span direction, wherein the leading edge panel has a first side portion extending from a leading edge point to a first attachment end, wherein the leading edge panel has a second side portion opposite the first side portion, extending from the leading edge point to a second attachment end, wherein the leading edge panel comprises an inner surface facing the plenum and an outer surface in contact with an ambient flow, and wherein the leading edge panel comprises a plurality of micro pores forming a fluid connection between the plenum and the ambient flow, wherein a first air inlet/outlet device is arranged in the first side portion and a second air inlet outlet/device is arranged in the second side portion of the leading edge panel, wherein the first air inlet/outlet device and the second air inlet/outlet device are fluidly connected to the plenum, wherein the first air inlet/outlet device comprises a first door pivotable by a first hinge about a first hinge axis, and the second air inlet outlet/device comprises a second door pivotable by a second hinge about a second hinge axis, wherein both the first door and the second door are pivotable between an outlet position, a closed position, and an inlet position, and wherein two actuators are provided, one actuator for each of the first door and the second door, for actuating the first door and the second door for movement between the outlet position, the closed position and the inlet position. In such an alternative embodiment, it might be preferred that the first actuator is pivotably mounted with its first end to a first lever mounted to the first door at the first hinge axis in a torque proof manner, preferably at the upper side of the first door, while the second actuator is pivotably mounted with its first end to a second lever mounted to the second door at the second hinge axis in a torque proof manner, preferably at the lower side of the second door, such that preferably the first and second actuators are arranged on opposite sides of the duct connecting the first and second air inlet/outlet devices to the plenum, preferably the first actuator being arranged above and the second actuator being arranged below the duct. Preferably, first and second actuators are configured for being pivotably mounted with their second ends to the front spar. It might also be preferred that the first and second doors are formed and/or actuated symmetrically. However, the first and second doors might also be formed and/or actuated asymmetrically. It might further be preferred that the first hinge and the second hinge are mounted to a duct structure of a duct forming a fluid connection between the first and second air inlet/outlet devices and the plenum. The duct structure in turn might be mounted to the leading edge panel and/or to the front spar. However, the first hinge and the second hinge might also be mounted to the leading edge panel directly. By this alternative embodiment, a very simple and compact design of the leading edge structure, specifically the door actuation is obtained.

In a design variant of the leading edge structure according to any of the embodiment described above, instead of having first and second air inlet/outlet devices, the leading edge structure might have only the first air inlet/outlet device as described above, while the second air inlet/outlet device is omitted. In particular, the leading edge structure comprises a leading edge panel that surrounds a plenum in a curved manner, the plenum extending in a span direction, wherein the leading edge panel has a first side portion extending from a leading edge point to a first attachment end, wherein the leading edge panel has a second side portion opposite the first side portion, extending from the leading edge point to a second attachment end, wherein the leading edge panel comprises an inner surface facing the plenum and an outer surface in contact with an ambient flow, and wherein the leading edge panel comprises a plurality of micro pores forming a fluid connection between the plenum and the ambient flow, wherein a first air inlet/outlet device is arranged in the first side portion of the leading edge panel, wherein the first air inlet/outlet device is fluidly connected to the plenum, wherein the first air inlet/outlet device comprises a first door pivotable by a first hinge about a first hinge axis, wherein the first door is pivotable between an outlet position, a closed position, and an inlet position, and wherein one single actuator is provided for actuating the first door for movement between the outlet position, the closed position and the inlet position. In such a design variant, it might be preferred that the first lever extends in a curved manner around a duct connecting the first inlet/outlet device to the plenum, wherein the first lever is mounted to the first door at the first hinge axis in a torque proof manner, while the actuator is pivotably mounted with its first end to the first lever via the fifth hinge, and preferably is configured for being pivotably mounted with its second end to the front spar via the sixth hinge. It might also be preferred that the first hinge is mounted to a duct structure of a duct forming a fluid connection between the first and second air inlet/outlet devices and the plenum. The duct structure in turn might be mounted to the leading edge panel and/or to the front spar. However, the first hinge might also be mounted to the leading edge panel directly. In such a way, a very simple and compact design of the leading edge structure, specifically the air inlet/outlet device and the door actuation is obtained.

A further aspect of the present invention relates to a vertical tail plane for an aircraft. The vertical tail plane comprises a vertical tail plane box including a front spar, and a leading edge structure according to any of the embodiments and design variants described herein. The vertical tail plane box has a first lateral panel with a first attachment portion and an opposite second lateral panel with a second attachment portion. First and second lateral panels are preferably mounted to the front spar. The first attachment end of the leading edge structure is attached to the first attachment portion and the second attachment end is attached to the second attachment portion, so that the first side portion of the leading edge panel forms a continuous flow surface with the first lateral panel of the vertical tail plane box and the second side portion of the leading edge panel forms a continuous flow surface with the second lateral panel of the vertical tail plane box. The features and advantageous described in connection with the leading edge structure apply vis-à-vis to the vertical tail plane.

According to a preferred embodiment, the first and second panel parts are arranged at the vertical tail plane box next to each other in the span direction such that preferably the first panel part is arranged further outbound and the second panel part is arranged further inbound, i.e. closer to a root of the vertical tail plane, i.e. closer to a fuselage. In such a way, the ambient air flow passing the micro pores is independent from the ambient air flow passing the first and second inlet/outlet devices.

A further aspect of the present invention relates to an aircraft comprising a leading edge structure according to any of the embodiments and design variants described herein, or comprising a vertical tail plane according to any of the embodiment described herein. The features and advantageous described in connection with the leading edge structure and with the vertical tail plane apply vis-à-vis to the aircraft.

SUMMARY OF DRAWINGS

A preferred embodiment of the present invention is described hereinafter in more detail by means of a drawing. The drawing shows in.

DETAILED DESCRIPTION

Figure 1:
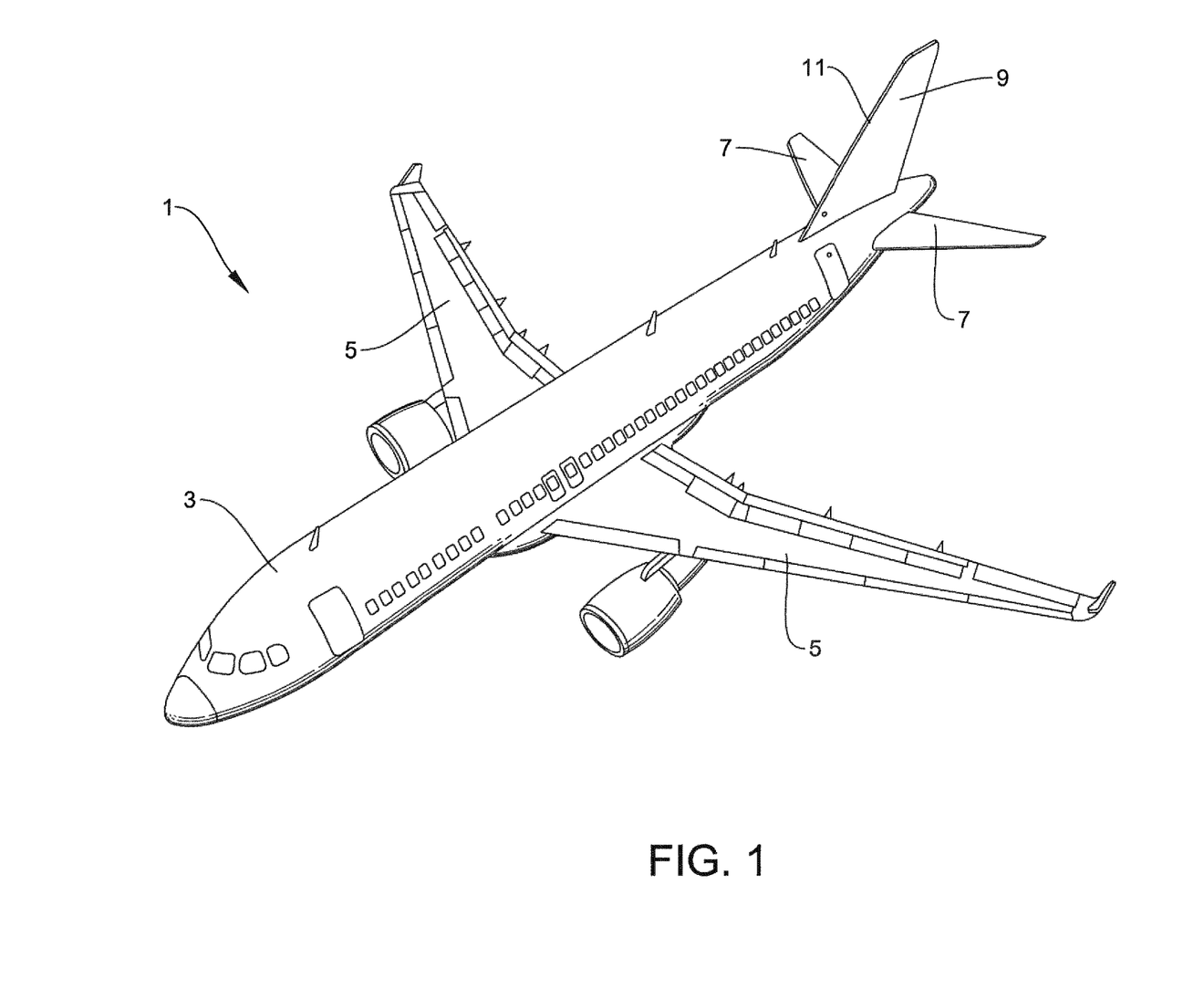
FIG. 1 a perspective view of an aircraft according to the invention.

In FIG. 1 an aircraft 1 according to an embodiment of the present invention is shown. The aircraft comprises a fuselage 3, wings 5, a horizontal tail plane 7, and a vertical tail plane 9 according to an embodiment of the invention. The vertical tail plane 9 is shown in more detail in FIG. 2. The vertical tail plane 9 comprises a leading edge structure 11 according to an embodiment of the invention. Various embodiments of the leading edge structure 11 are shown in more detail in FIGS. 3 to 8, wherein FIG. 3 shows a cross section at a first span level in the area of a first panel part 13a while FIGS. 4 to 8 show cross sections at a second span level in the area of a second panel part.

Figure 2:
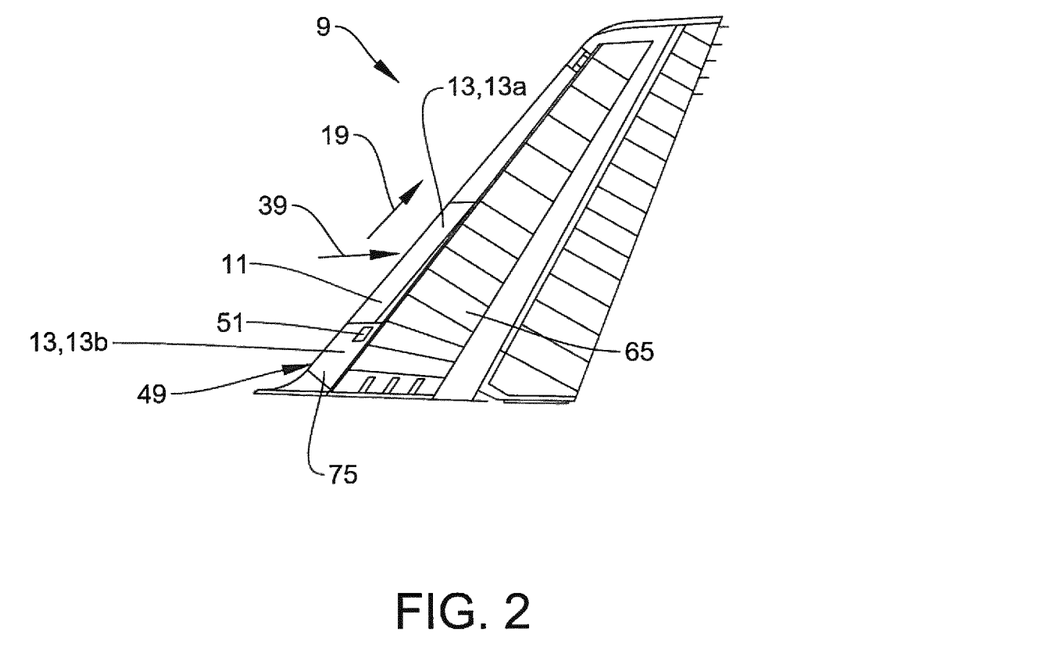
FIG. 2 a side view of a vertical tail plane according to the invention.
Figure 3:
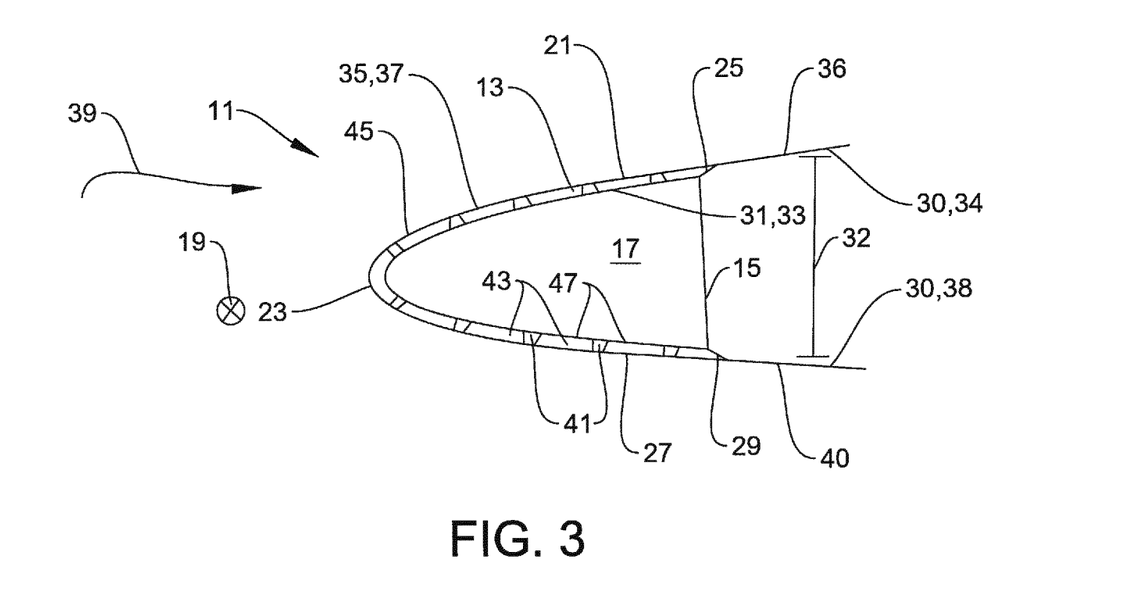
FIG. 3 a cross sectional view across the span direction in the area of a first panel part of a leading edge structure mounted to a vertical tail plane box, according to an embodiment of the invention, FIG. 4 a schematic cross sectional view across the span direction in the area of a second panel part of a leading edge structure according to a first embodiment of the invention, FIG. 5 a more detailed cross sectional view of the leading edge structure shown in FIG. 4, wherein the first and second doors and the linkage are shown in all three positions in a superposed manner, FIG. 6 a schematic cross sectional view across the span direction in the area of a second panel part of a leading edge structure according to a second embodiment of the invention, FIG. 7 a schematic cross sectional view across the span direction in the area of a second panel part of a leading edge structure according to a third embodiment of the invention, FIG. 8 a more detailed cross sectional view of the leading edge structure shown in FIG. 7, FIG. 9 a schematic cross sectional view across the span direction in the area of a second panel part of a leading edge structure according to a design variant, FIG. 10 a perspective view of the leading edge structure shown in FIG. 9, FIG. 11 a schematic cross sectional view across the span direction in the area of a second panel part of a leading edge structure according to an alternative embodiment of the invention, FIG. 12 a perspective view of the leading edge structure shown in FIG. 11.

As shown in FIGS. 2 and 3, the leading edge structure 11 is configured for hybrid laminar flow control and comprises a leading edge panel 13 comprising first and second panel parts 13a, 13b, and a back wall 15. The first and second panel parts 13a, 13b are formed separately as two separate parts and are mounted to the vertical tail plane 9 next to each other in a the span direction 19, wherein the first panel part 13a is arranged further outbound and the second panel part 13b is arranged further inbound, see FIG. 2. The leading edge panel 13 surrounds a plenum 17 in a curved manner. The plenum 17 extends in the span direction 19 through the leading edge structure 11. When viewed in a cross section across the span direction 19, the leading edge panel 13 has a first side portion 21 extending from a leading edge point 23 to a first attachment end 25 on a first side of the leading edge structure 11. Further, the leading edge panel 13 has a second side portion 27 opposite the first side portion 21, wherein the second side portion 27 extends from the leading edge point 23 to a second attachment end 29 on a second side of the leading edge structure 11 opposite the first side. The back wall 15 connects the first attachment end 25 to the second attachment end 29 of the leading edge panel 13, thereby enclosing the plenum 17 on a side opposite the leading edge point 23.

As also shown in FIGS. 2 and 3, the vertical tail plane 9 comprises a vertical tail plane box 30 including a front spar 32, and the leading edge structure 11 is mounted to the vertical tail plane box 30. The vertical tail plane box 30 has a first lateral panel 34 with a first attachment portion 36 and an opposite second lateral panel 38 with a second attachment portion 40. The first attachment end 25 of the leading edge structure 11 is attached to the first attachment portion 36 and the second attachment end 29 is attached to the second attachment portion 40, so that the first side portion 21 of the leading edge panel 13 forms a continuous flow surface with the first lateral panel 34 of the vertical tail plane box 30 and the second side portion 27 of the leading edge panel 13 forms a continuous flow surface with the second lateral panel 38 of the vertical tail plane box 30.

As also shown in FIG. 3, the leading edge panel 13 has a double-walled form including an inner wall element 31 having an inner surface 33 facing the plenum 17, and an outer wall element 35 having an outer surface 37 in contact with an ambient flow 39. Between the inner and outer wall elements 31, 35 the leading edge panel 13 comprises a plurality of elongate stiffeners 41 extending in the span direction 19 and spaced apart from one another, so that between each pair of adjacent stiffeners 41 a hollow chamber 43 is formed between the inner and outer wall elements 31, 35. The stiffeners 41 are formed integrally with the inner wall element 31 in a sandwich form and have a solid, trapezoid-shaped cross section. The inner wall element 31 is formed of a fiber reinforced plastic (FRP). The outer wall element 35 is formed as a titanium sheet and comprises a plurality of micro pores 45 forming a fluid connection between the hollow chambers 43 and the ambient flow 39. The inner wall element 31 comprises openings 47 forming a fluid connection between the hollow chambers 43 and the plenum 17.

As shown in FIGS. 4 to 8, a first air inlet/outlet device 49 is arranged in the first side portion 21 and a second air inlet outlet/device 51 is arranged in the second side portion 27 of the leading edge panel 13. Both first and second air inlet/outlet devices 49, 51 are configured for letting in air of the ambient flow 39 into the plenum 17 and for discharging air from the plenum 17 into the ambient flow 39. The first air inlet/outlet device 49 and the second air inlet/outlet device 51 are fluidly connected to the plenum 17 via a duct 53 extending in the span direction 19 between the first and second panel parts 13a, 13b.

The first air inlet/outlet device 49 comprises a first door 55 pivotable relative to the leading edge panel 13 by a first hinge 57 about a first hinge axis 59. Likewise, the second air inlet outlet/device 51 comprises a second door 61 pivotable relative to the leading edge panel 13 by a second hinge 63 about a second hinge axis 65. The first hinge axis 59 is arranged at a leading edge of the first door 55, and the second hinge axis 65 is arranged at a leading edge of the second door 61. The first and second doors 55, 61 are formed and arranged symmetrically.

Both the first door 55 and the second door 61 are pivotable between an outlet position 67, a closed position 69, and an inlet position 71. In the outlet position 67, air from an ambient flow 39 is let in through the respective first or second air inlet/outlet device 49, 51 into the plenum 17, wherein the respective first or second door 55, 61 pivots outwards into the ambient flow 39 so that it extends external to an outer mold line, forming a rearward facing opening. In the closed position 69, no air stream through the respective first or second inlet/outlet device 49, 51 is allowed and the first or second door 55, 61 is preferably flush with the outer mold line. In the inlet position 71, air from an ambient flow 39 is let out from the plenum 17 through the respective first or second air inlet/outlet device 49, 51 into the ambient flow 39, wherein the respective first or second door 55, 61 pivots inwards inside the leading edge structure 11 so that it extends internal to the outer mold line, forming a forward facing opening.

Further, one single actuator 73 is provided for commonly actuating the first door 55 and the second door 61 for common, symmetric movement between the outlet position 67, the closed position 69 and the inlet position 71. The actuator 73 is formed as an electric or hydraulic linear actuator configured to adjust upon actuation the distance between its first and second ends 75, 77.

Figure 4:
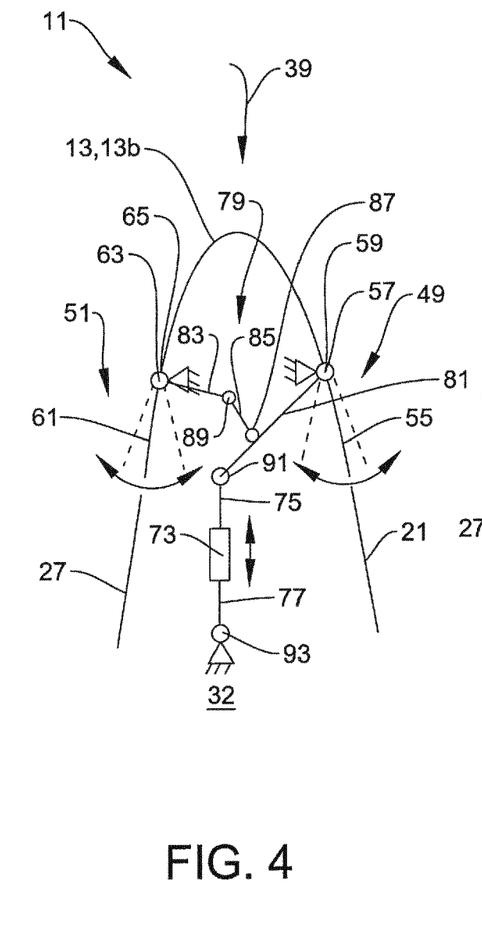
Figure 5:
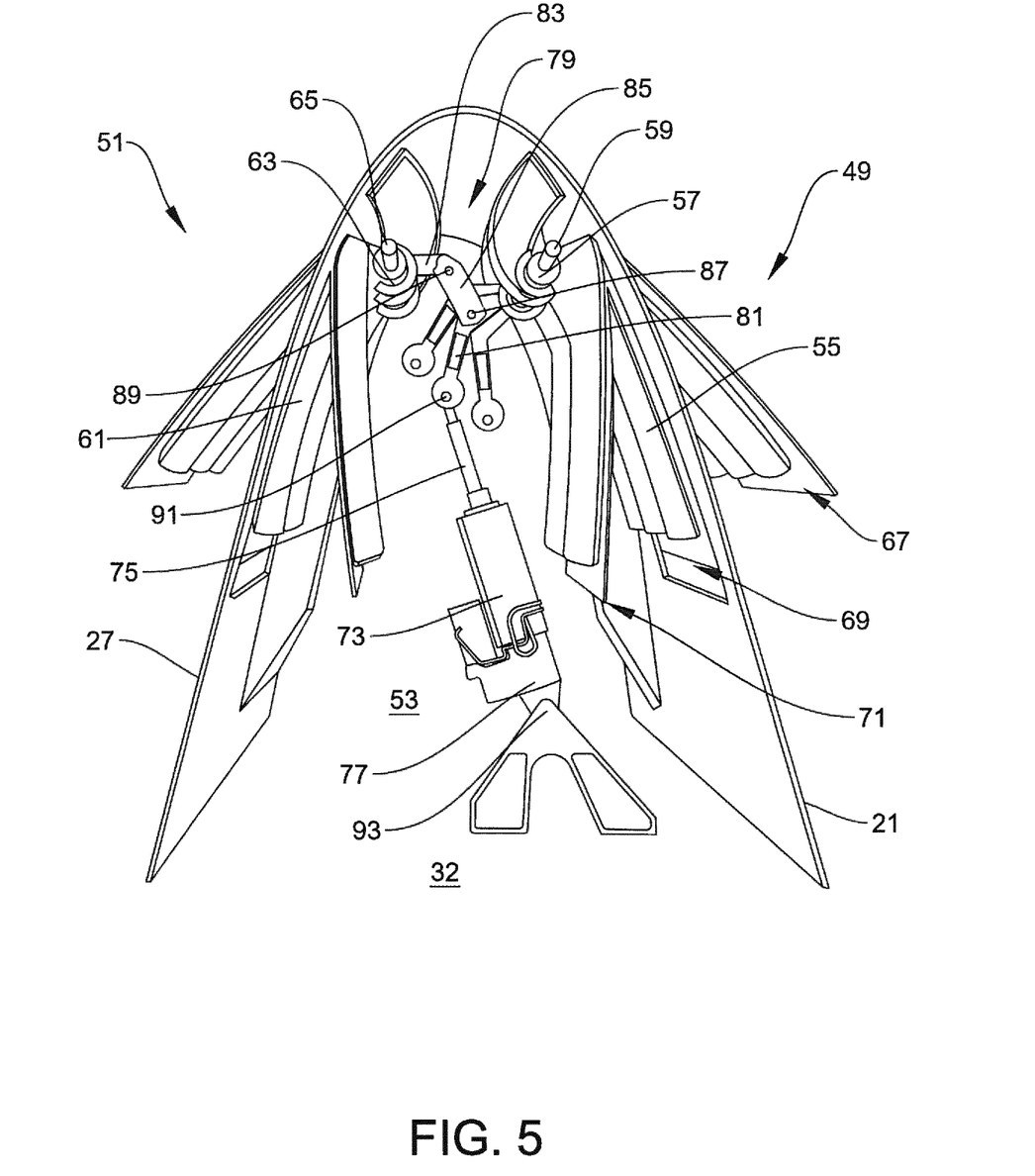
Figure 6:
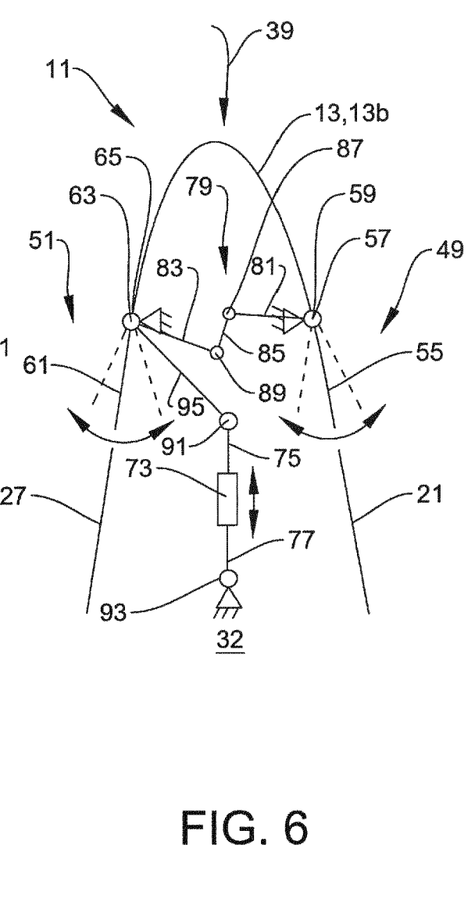

In the embodiment shown in FIGS. 4 to 6, the actuator 73 is connected to the first door 55 and to the second door 61 via a linkage 79. The linkage 79 is configured to transfer a linear movement of the actuator 73 into a pivot movement of the first and second doors 55, 61 between the outlet position 67, the closed position 69 and the inlet position 71. The linkage 79 comprises a first lever 81 mounted to the first door 55 at the first hinge axis 59 in a torque proof manner. The linkage 79 further comprises a second lever 83 mounted to the second door 61 at the second hinge axis 65 in a torque proof manner. The first lever 81 and the second lever 83 are connected via a link 85 that is pivotably mounted to the first lever 81 via a third hinge 87 and that is pivotably mounted to the second lever 83 via a fourth hinge 89.

In the embodiment shown in FIGS. 4 and 5, the actuator 73 is pivotably mounted with its first end 75 to the first lever 81 via a fifth hinge 91. Further, the actuator 73 is pivotably mounted with its second end 77 to the front spar 32 of the vertical tail plane box 30 via a sixth hinge 93. The first lever 81 extends beyond the third hinge 87, so that the third hinge 87 is positioned between and spaced apart from the first hinge 57 and the fifth hinge 91.

In the alternative embodiment shown in FIG. 6, the actuator 73 is connected to the first lever 81 or to the second lever 83 via an actuation arm 95. The actuation arm 95 is mounted to the second lever 83 at the second hinge axis 65 in a torque proof manner. The actuator 73 is pivotably mounted with its first end 75 to the actuation arm 95 via a fifth hinge 91. Further, the actuator 73 is pivotably mounted with its second end 77 to the front spar 32 via a sixth hinge 93.

Figure 7:
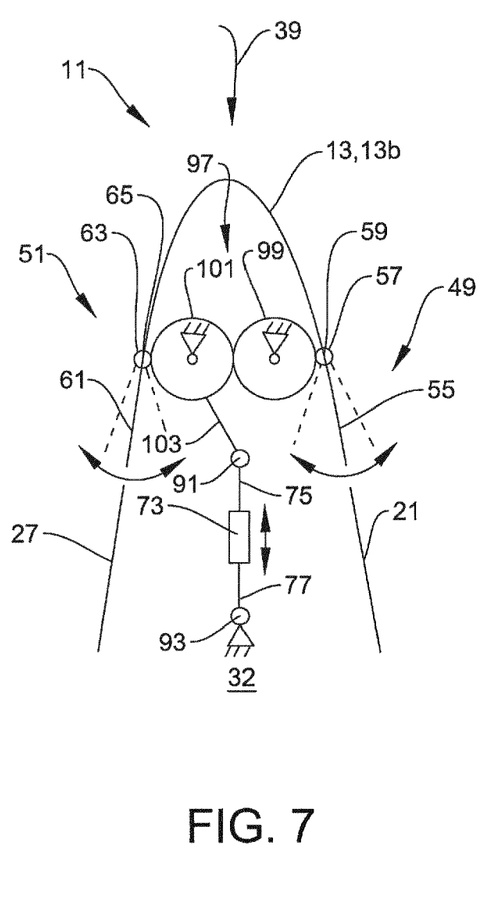
Figure 8:
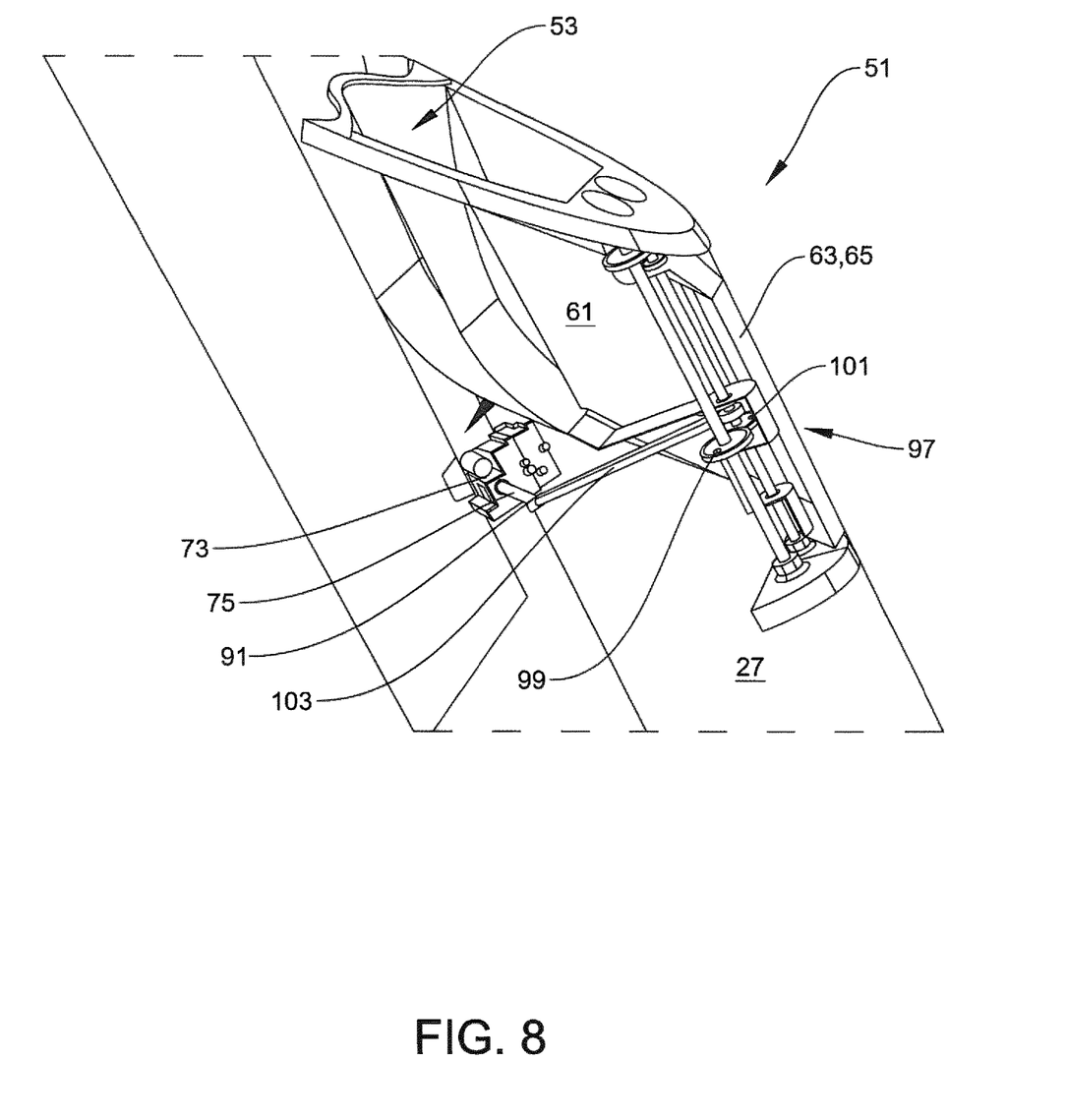

In the alternative embodiment shown in FIG. 7, the actuator 73 is connected to the first door 55 and to the second door 61 via a gear transmission 97. The gear transmission 97 is configured to transfer a linear movement of the actuator 73 into a pivot movement of the first and second doors 55, 61 between the outlet position 67, the closed position 69 and the inlet position 71. The gear transmission 97 comprises a first gear 99 connected to the first door 55 in a torque proof manner coaxially with the first hinge axis 59. Further, the gear transmission 97 comprises a second gear 101 connected to the second door 61 in a torque proof manner coaxially with the second hinge axis 65. The first gear 99 and the second gear 101 are connected in a torque transferring manner, in the present embodiment by direct engagement. The actuator 73 is connected to the second gear 101 via an actuation lever 103 that is mounted to the second gear 101 in a torque proof manner. The actuator 73 is pivotably mounted with its first end 75 to the actuation lever 103 via a fifth hinge 91. Further, the actuator 73 is pivotably mounted with its second end 77 to the front spar 32 of the vertical tail plane box 30 via a sixth hinge 93.

Figure 9:
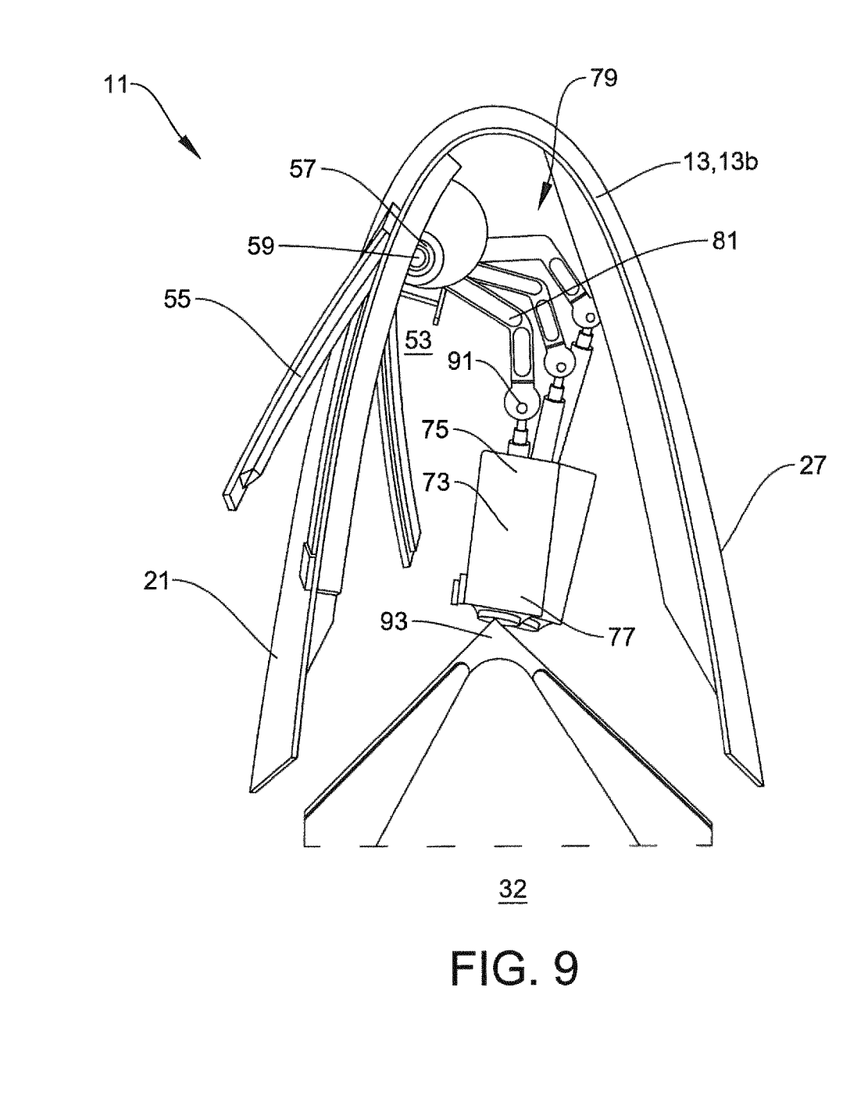
Figure 10:
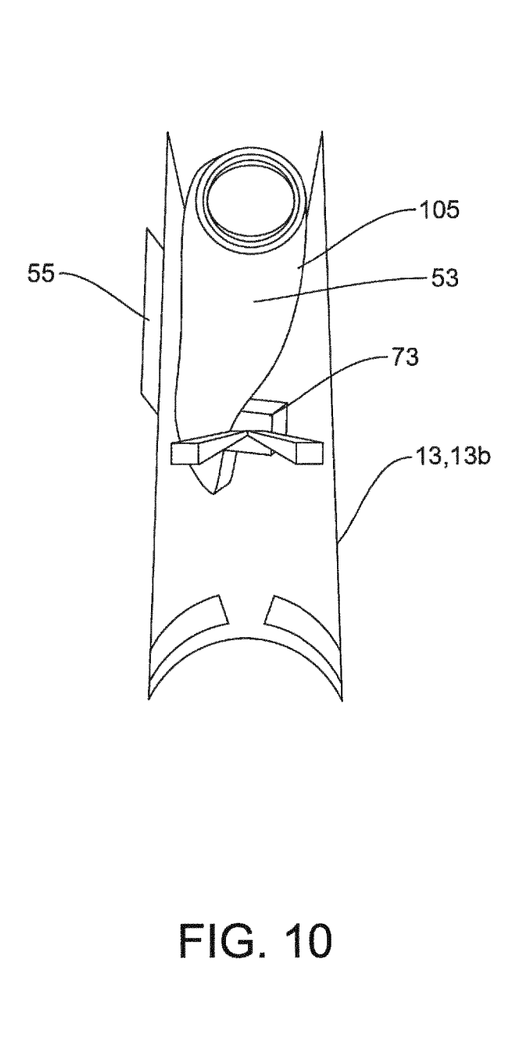

FIGS. 9 and 10 show a design variant of the leading edge structure 11 according to any of the embodiment described above, wherein instead of having first and second air inlet/outlet devices 49, 51, the leading edge structure 11 has only the first air inlet/outlet device 49 as described above, while the second air inlet/outlet device 51 is omitted.

The leading edge structure 11 comprises inter alia a leading edge panel 13 that surrounds a plenum 17 in a curved manner, the plenum 17 extending in a span direction 19, wherein the leading edge panel 13 has a first side portion 21 extending from a leading edge point 23 to a first attachment end 25, wherein the leading edge panel 13 has a second side portion 27 opposite the first side portion 21, extending from the leading edge point 23 to a second attachment end 29, wherein the leading edge panel 13 comprises an inner surface 33 facing the plenum 17 and an outer surface 37 in contact with an ambient flow 39, and wherein the leading edge panel 13 comprises a plurality of micro pores 45 forming a fluid connection between the plenum 17 and the ambient flow 39, wherein a first air inlet/outlet device 49 is arranged in the first side portion 21 of the leading edge panel 13, wherein the first air inlet/outlet device 49 is fluidly connected to the plenum 17, wherein the first air inlet/outlet device 49 comprises a first door 55 pivotable by a first hinge 57 about a first hinge axis 59, wherein the first door 55 is pivotable between an outlet position 67, a closed position 69, and an inlet position 71, and wherein one single actuator 73 is provided for actuating the first door 55 for movement between the outlet position 67, the closed position 69 and the inlet position 71.

As shown in FIGS. 9 and 10, the first lever 81 extends in a curved manner around a duct 53 connecting the first air inlet/outlet device 49 to the plenum 17, wherein the first lever 81 is mounted to the first door 55 at the first hinge axis 59 in a torque proof manner, while the actuator 73 is pivotably mounted with its first end 75 to the first lever 81 via the fifth hinge 91, and is pivotably mounted with its second end 77 to the front spar 32 via the sixth hinge 93. Further, the first hinge 57 is mounted to a duct structure 105 of a duct 53 forming a fluid connection between the first and second air inlet/outlet devices 49, 51 and the plenum 17. The duct structure 105 in turn is mounted to the front spar 32.

Figure 11:
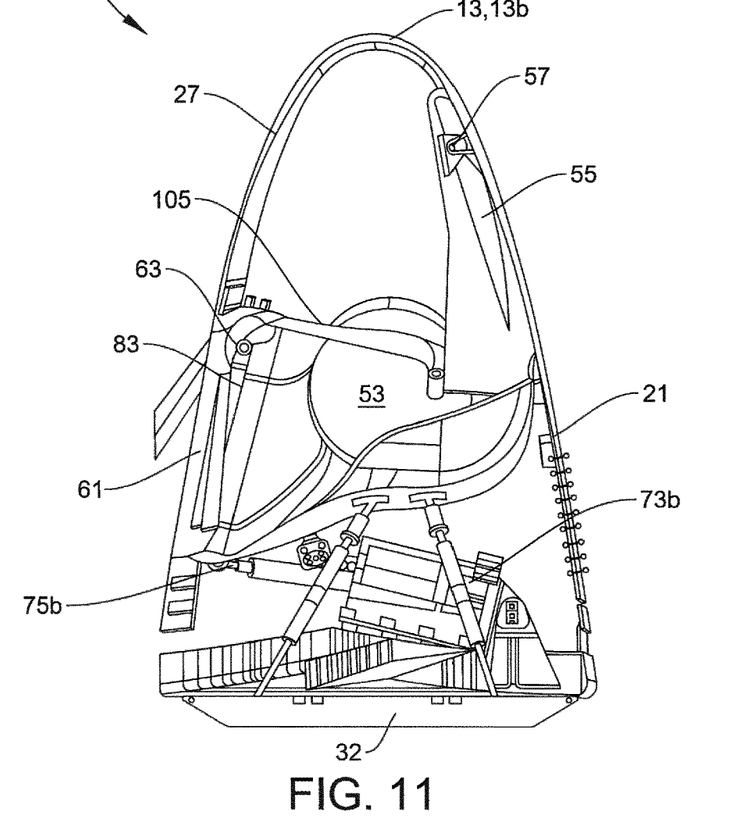
Figure 12:
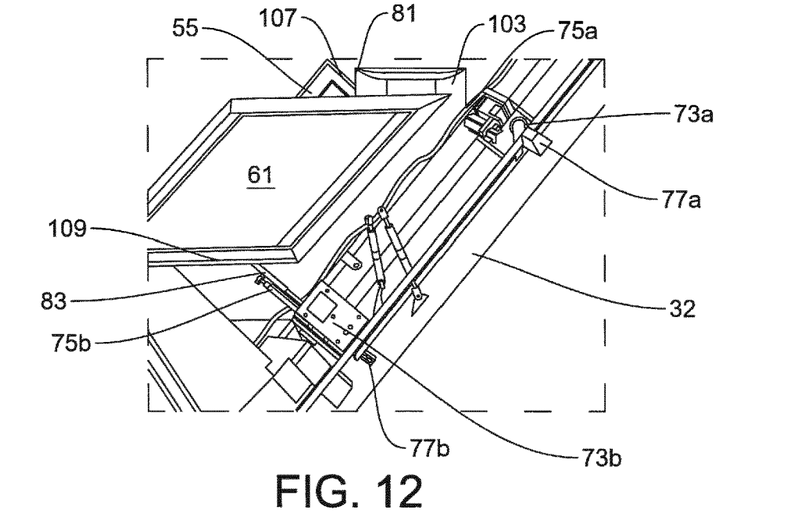

FIGS. 11 and 12 show an alternative embodiment of the leading edge structure 11 according to any of the embodiments of the invention as described above, wherein instead of having only one single actuator 73 for commonly actuating the first and second doors 55, 61, two actuators 73a, 73b are provided, such that a first actuator 73a is configured for actuating the first door 55 for movement between the outlet position 67, the closed position 69 and the inlet position 71, while the second actuator 73b is configured for actuating the second door 61 for movement between the outlet position 67, the closed position 69 and the inlet position 71. The first and second actuators 73a, 73b are formed as the actuator 73 described above.

The leading edge structure 11 comprises inter alia a leading edge panel 13 that surrounds a plenum 17 in a curved manner, the plenum 17 extending in a span direction 19, wherein the leading edge panel 13 has a first side portion 21 extending from a leading edge point 23 to a first attachment end 25, wherein the leading edge panel 13 has a second side portion 27 opposite the first side portion 21, extending from the leading edge point 23 to a second attachment end 29, wherein the leading edge panel 13 comprises an inner surface 33 facing the plenum 17 and an outer surface 37 in contact with an ambient flow 39, and wherein the leading edge panel 13 comprises a plurality of micro pores 45 forming a fluid connection between the plenum 17 and the ambient flow 39, wherein a first air inlet/outlet device 49 is arranged in the first side portion 21 and a second air inlet outlet/device 51 is arranged in the second side portion 27 of the leading edge panel 13, wherein the first air inlet/outlet device 49 and the second air inlet/outlet device 51 are fluidly connected to the plenum 17, wherein the first air inlet/outlet device 49 comprises a first door 55 pivotable by a first hinge 57 about a first hinge axis 59, and the second air inlet outlet/device 51 comprises a second door 61 pivotable by a second hinge 63 about a second hinge axis 65, wherein both the first door 55 and the second door 61 are pivotable between an outlet position 67, a closed position 69, and an inlet position 71, and wherein two actuators 73a, 73b are provided, one actuator 73a, 73b for each of the first door 55 and the second door 61, for actuating the first door 55 and the second door 61 for movement between the outlet position 67, the closed position 69 and the inlet position 71.

As shown in FIGS. 11 and 12, the first actuator 73a is pivotably mounted with its first end 75a to a first lever 81 mounted to the first door 55 at the first hinge axis 59 in a torque proof manner at the upper side 107 of the first door 55, while the second actuator 73b is pivotably mounted with its first end 75b to a second lever 83 mounted to the second door 61 at the second hinge axis 65 in a torque proof manner at the lower side 109 of the second door 61, such that preferably the first and second actuators 73a, 73b are arranged on opposite sides of the duct 53 connecting the first and second air inlet/outlet devices 49, 51 to the plenum 17, the first actuator 73a being arranged above and the second actuator 73b being arranged below the duct 53. Further, first and second actuators 73a, 73b are configured for being pivotably mounted with their second ends 77a, 77b to the front spar 32. The first hinge 57 and the second hinge 63 are mounted to a duct structure 105 of a duct 53 forming a fluid connection between the first and second air inlet/outlet devices 49, 51 and the plenum 17. The duct structure 105 in turn is mounted to the front spar 32.

The invention claimed is:

1. A leading edge structure for a flow control system of an aircraft, comprising
   a leading edge panel that surrounds a plenum in a curved manner, the plenum extending in a span direction,
   wherein the leading edge panel has a first side portion extending from a leading edge point to a first attachment end,
   wherein the leading edge panel has a second side portion opposite the first side portion, extending from the leading edge point to a second attachment end,
   wherein the leading edge panel comprises an inner surface facing the plenum and an outer surface in contact with an ambient flow, and
   wherein the leading edge panel comprises a plurality of micro pores forming a fluid connection between the plenum and the ambient flow,
   wherein a first air inlet/outlet device is arranged in the first side portion and a second air inlet outlet/device is arranged in the second side portion of the leading edge panel,
   wherein the first air inlet/outlet device and the second air inlet/outlet device are fluidly connected to the plenum, and
   wherein the first air inlet/outlet device comprises a first door pivotable by a first hinge about a first hinge axis, and the second air inlet outlet/device comprises a second door pivotable by a second hinge about a second hinge axis,
   both the first door and the second door are pivotable between an outlet position, a closed position, and an inlet position.

2. The leading edge structure according to claim 1, wherein one single actuator is provided for commonly actuating the first door and the second door for common movement between the outlet position, the closed position and the inlet position.

3. The leading edge structure according to claim 2, wherein the actuator is formed as a linear actuator configured to adjust the distance between its first and second ends.

4. The leading edge structure according to claim 3, wherein the actuator is connected to the first door and to the second door via a linkage, wherein the linkage is configured to transfer a linear movement of the actuator into a pivotable movement of the first and second doors between the outlet position, the closed position and the inlet position.

5. The leading edge structure according to claim 4, wherein the linkage, comprises a first lever mounted to the first door at the first hinge axis in a torque proof manner,
wherein the linkage comprises a second lever mounted to the second door at the second hinge axis in a torque proof manner,
wherein the first lever and the second lever are connected via a link pivotably mounted to the first lever via a third hinge and that is pivotably mounted to the second lever via a fourth hinge.

6. The leading edge structure according to claim 5, wherein the actuator is pivotably mounted with its first end to the first lever or to the second lever via a fifth hinge, and
wherein the actuator is configured for being pivotably mounted with its second end to a front spar via a sixth hinge.

7. The leading edge structure according to claim 6, wherein the first lever extends beyond the third hinge, and the third hinge is between the first hinge and the fifth hinge, or
wherein the second lever extends beyond the fourth hinge and the fourth hinge is between the second hinge and the fifth hinge.

8. The leading edge structure according to claim 5, wherein the actuator is connected to the first lever or to the second lever via an actuation arm,
wherein the actuation arm is mounted to the first lever at the first hinge axis or to the second lever at the second hinge axis in a torque proof manner,
wherein a first end of the actuator is pivotably mounted to the actuator mounted to the actuation arm via a fifth hinge, and
wherein a second end of the actuator is configured for being pivotably mounted to a front spar via a sixth hinge.

9. The leading edge structure according to claim 3, wherein the actuator is connected to the first door and to the second door via a gear transmission,
wherein the gear transmission is configured to transfer a linear movement of the actuator into a pivotable movement of the first and second doors between the outlet position, the closed position and the inlet position.

10. The leading edge structure according to claim 9, wherein the gear transmission comprises a first gear connected to the first door in a torque proof manner coaxially with the first hinge axis and,
wherein the gear transmission comprises a second gear connected to the second door in a torque proof manner coaxially with the second hinge axis, and
wherein the first gear and the second gear are connected in a torque transferring manner.

11. The leading edge structure according to claim 10, wherein the first gear and the second gear are directly engaged.

12. The leading edge structure according to claim 10, wherein the first gear and the second gear are connected via one or more additional gears.

13. The leading edge structure according to claim 10, wherein the actuator is connected to the first gear or to the second gear via an actuation lever,
wherein the actuation lever is mounted to the first gear or to the second gear or to one additional gear in a torque proof manner,
wherein the actuator is pivotably mounted with its first end to the actuation lever via a fifth hinge, and
wherein the actuator is configured for being pivotably mounted with its second end to a front spar via a sixth hinge.

14. The leading edge structure according to claim 4, wherein the linkage or the gear transmission is configured such that the first door and the second door are moved between the outlet position, the closed position and the inlet position in a symmetrical way.

15. The leading edge structure according to claim 1, wherein the first hinge axis is arranged at a leading edge of the first door, and/or
wherein the second hinge axis is arranged at a leading edge of the second door.

16. The leading edge structure according to claim 1, wherein the first hinge and the second hinge are mounted to a duct structure while the duct structure is mounted to the leading edge panel or to the front spar.

17. The leading edge structure according to claim 1, wherein the leading edge panel comprises first and second panel parts arranged next to each other in the span direction, wherein the first panel part includes the micro pores and a second panel part includes the first and second air inlet/outlet devices, and wherein the first and second panel parts are formed either integrally or as two separate parts.

18. The leading edge structure according to claim 1, wherein two actuators are provided for actuating the first and second doors, such that a first actuator is configured for actuating the first door for movement between the outlet position, the closed position and the inlet position, while the second actuator is configured for actuating the second door for movement between the outlet position, the closed position and the inlet position.

19. A vertical tail plane comprising
a vertical tail plane box having a first lateral panel with a first attachment portion and an opposite second lateral panel with a second attachment portion,
the leading edge structure according to claim 1,
wherein the first attachment end is attached to the first attachment portion, and wherein the second attachment end is attached to the second attachment portion, so that the first side portion of the leading edge panel forms a continuous flow surface with the first lateral panel of the vertical tail plane box, and the second side portion of the leading edge panel forms a continuous flow surface with the second lateral panel of the vertical tail plane box.

20. The vertical tail plane according to claim 19, wherein the first and second panel parts are arranged at the vertical tail plane box next to each other in the span direction such that the first panel part is arranged further outbound and the second panel part is arranged further inbound.

* * * * *